Figure 1B:
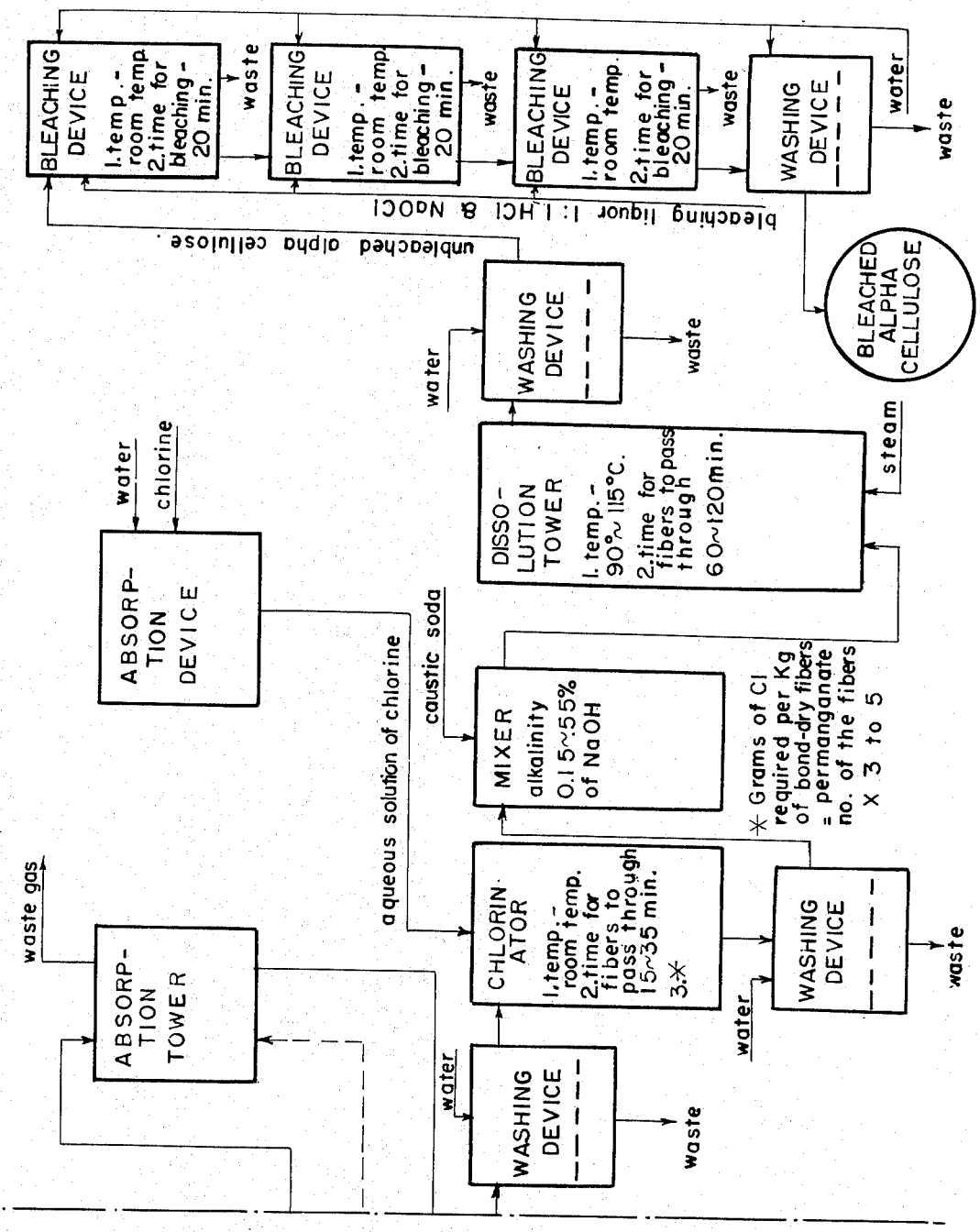

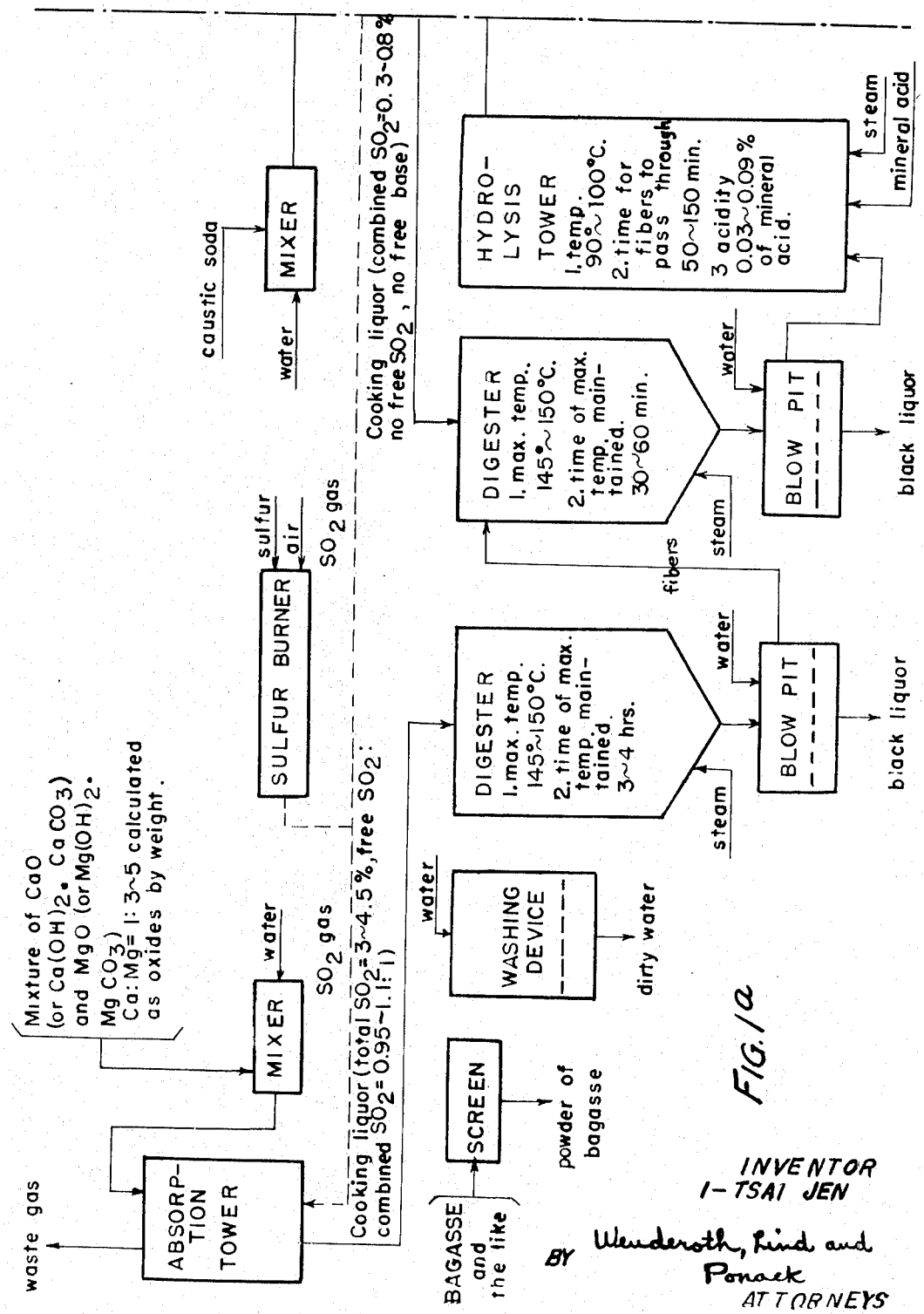

United States Patent Office 2,731,345
Patented Jan. 17, 1956

2,731,345

PROCESS OF MAKING ALPHA CELLULOSE FROM FIBROUS LIGNO-CELLULOSE MATERIALS, PARTICULARLY FROM BAGASSE

I-Tsai Jen, Taipei, Taiwan, China

Application February 27, 1953, Serial No. 339,403

4 Claims. (Cl. 92—11)

The present invention relates to a process of making alpha-cellulose from fibrous ligno-cellulose materials particularly from bagasse. This process is characterized by a two-stage digestion for removing the greater portion of lignin with very little degradation of the residual cellulose, hydrolysing the hemi-cellulose constituents with a low concentration of a mineral acid, chlorinating the residual lignin in the cellulose and oxidizing the hydrolysed hemi-cellulose by chlorine water with very little degradation of the cellulose and dissolving the chlorinated lignin and degraded hemi-cellulose by means of a diluted caustic soda solution, thereby obtain alpha cellulose of high quality, whose purity is above 92% and whose degree of polymerization is above 1000.

It has long been known that alpha cellulose may be made from various fibrous ligno-cellulose materials. Certain processes have been used to make alpha-cellulose from wood but due to the high cost of wood, as compared with bagasse, it would be more economical to make alpha-cellulose from bagasse than from wood. The processes which may be used to make alpha cellulose from wood, however, are entirely unsuitable when applied to obtain alpha cellulose from bagasse. The fibers of bagasse are short and weak and become severely degraded when subjected to the same processes which are used to make alpha cellulose from wood. An object of the invention is to provide a process for producing alpha cellulose of high purity and high degree of polymerization from bagasse and similar fibrous lignose-cellulose materials under novel conditions of treatment which prevent the degradation or oxidation of the cellulose in the bagasse and which removes substantially the entire lignin content of the starting material.

A further object of the invention is to provide a new alpha cellulose product obtained from the hydrolytic purification of bagasse and similar ligno-cellulose materials under mild purification conditions to obtain a readily bleachable alpha cellulose product containing more than 92% of alpha cellulose and from about 7 to 8% of beta and gamma cellulose, the product containing no other impurity than about .1 to .2% of ether extractive matter and about .2% of ash.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In connection with that more detailed description, there is shown in the drawings, in Figure 1a and 1b, a flow sheet provided with legends to indicate the process of the invention.

*The two-stage digestion of the flow-sheet, Figures 1a and 1b*

The fibers of bagasse are short and weak and are easily degraded. I have found that such fibers, if digested with sulfite liquor, should not be digested by such liquor at a temperature of over 150° C., and such maximum temperature should not be maintained for more than five hours. Otherwise, the alpha cellulose of the bagasse will be considerably degraded. The present process is carried out within such limits.

According to the process covered by this invention, the bagasse, after being screened to remove bagasse powder and other impurities, and after being washed with water, is placed in a digester to be digested in an aqueous solution containing from 3 to 4.5 percent total sulfurdioxide, as contained in calcium sulfite, magnesium sulfite and sulfurous acid, in the following ratio. The ratio of free sulfurdioxide to combined sulfurdioxide should be 0.95–1.1 to 1 calculated by weight and the ratio of magnesium to calcium should be 3–5 to 1, calculated as oxides by weight. The bagasse is immersed in the above mentioned solution in the digester. The bagasse and the solution in that digester are then heated to reach the maximum temperature of from 145° C. to 150° C. and such maximum temperature is maintained for a period of from three to four hours. After cooking in this manner, an excellent decomposition of the bagasse is attained. The solution, which becomes a black liquor after such digestion, is now drained off and the remaining digested bagasse which are the fibers after such digestion, is now washed clean with water.

The fibers produced from the foregoing digestion are then mixed with an aqueous neutral sodium sulfite solution so as to make a solution of from 5 to 10 per cent consistency containing from 0.3 to 0.8 per cent total sulfurdioxide, calculated by weight. The fibers so mixed are then placed in a second digester again to be digested, and heated during the second digestion to reach a maximum temperature of from 145° C. to 150° C. such maximum temperature to be maintained for a period of from 30 to 60 minutes. The solution which becomes a black liquor after such digestion, is now drained off and the remaining digested bagasse fibers are now washed clean with water.

The purpose for making the first stage digestion is to permit the free sulfurdioxide to partially hydrolyse the hemi-cellulose of the bagasse so as to facilitate its subsequent removal, and to permit the combined sulfurdioxide to react on the lignin constituents so as to render such lignin constituents soluble in water, under conditions which involve only a very slight degradation of the cellulose. During this first-stage digestion, however, a side reaction takes place when some of the free sulfurdioxide combines with some of the lignin constituents, thereby forming some lignin sulfuric acid, which must be removed. The main purpose for making the second-stage digestion is, therefore, to replace the hydrogen ion of the lignin sulfonic acid formed during the first-stage digestion, with the sodium ion of the neutral sodium sulfite, thereby forming sodium lignin sulfonate and the like, which is soluble in water and therefore easily removable. A further purpose of making the second-stage digestion is to partially dissolve the hydrolysed hemi-cellulose and such other impurities as may be present, by neutral sodium sulfite.

After undergoing this two-stage digestion process, the bagasse fibers can be easily bleached (consuming only about 8.61% of chlorine for 80° G. E. brightness), have a comparatively high alpha cellulose content (about 81.5%) and have a high degree of polymerization (about 38.3 centipoises according to TAPPI method on viscosity).

*Refining by hydrolysing, chlorinating and dissolving*

The bagasse fibers which have been subjected to the two-stage digestion above explained are then refined by the following process. These twice digested fibers, without being bleached, are then mixed with an aqueous mineral acid solution, such as hydrochloric acid, sulfuric acid or the like, particularly hydrochloric acid, so as to make a solution of from 5 to 10 percent consistency containing from .03 to .09 percent of mineral acid, calculated by weight. The slurry of fibers so mixed is then heated to reach a maximum temperature of 90° C. to 100° C., such maximum temperature to be maintained for a period of at least 50 minutes, preferably from 50 to 150 minutes. The solution is now drained off and the bagasse fibers so treated are now washed clean with water.

The bagasse fibers, after being treated as above explained, are then mixed with an aqueous solution of chlorine. Chlorine water is used to make a solution of 5–10% consistency, the proportion of the amount of chlorine to be used in the solution to the amount of the bagasse fibers to be mixed, to be fixed according to the following formula:

Grams of chlorine required for each kg. of fibers (calculated as bond-dry fibers) = permanganate number of the fibers $\times$ 3–5

The bagasse fibers, so mixed with the aqueous solution of chlorine are then kept at the temperature of about 15° C. to 30° C. for a period of from 15 to 35 minutes. The solution is now drained off and the bagasse fibers so treated are now washed clean with water.

The bagasse fibers, after being treated as above explained, are then mixed with an aqueous caustic soda solution so as to make a solution of from 5 to 10 percent consistency, containing from 0.15 to 0.55 percent of caustic soda calculated by weight. The bagasse fibers so mixed with the aqueous caustic soda solution are then heated to reach a maximum temperature of from 90° C. to 115° C., such maximum temperature to be maintained for a period of from 60 to 120 minutes. The solution which now becomes a black liquor is then drained off and the bagasse fibers which now becomes unbleached alpha cellulose after such caustic soda dissolution, are now washed clean with water.

There is a specific object and a specific reason for each of the steps in the procedure outlined above, leading finally to the result of making alpha cellulose of high quality from the bagasse fibers which have undergone the two-stage digestion process. The bagasse fibers are first hydrolysed with a very much diluted aqueous mineral acid solution, so as to break up the hemi cellulose into small pieces and thereby facilitate its subsequent removal. The hydrolysing effect of the mineral acid employed is only related to the acidity of the solution. For this reason, it is not necessary to use too much acid and it is sufficient to use only a small quantity of such acid to maintain the acidity of the solution. In this way, any possible degradation of the alpha cellulose during this phase of the process is kept to an absolute minimum. A further purpose for applying the mineral acid solution is to have it react on the ash content of the fibers and thereby render the most portion of such ash soluble in water, so as to become easily removable.

Thereafter, after the fibers have been washed clean, the treatment of such fibers with an aqueous solution of chlorine has a triple effect. In the first place, the residual lignin in the fibers reacts wtih the chlorine atoms in the solution to form chlorinated lignin, which will be soluble in an aqueous caustic soda solution. In the second place, the reaction of chlorine on water results in the formation of hydrochloric acid and hypochlorous acid, and the hypochlorous acid will oxidize the hydrolysed hemi-cellulose, so as to facilitate its subsequent removal. In the third place, the co-existence of the hydrochloric acid and the hypochlorous acid has the effect of removing a still greater part of the residual ash content of the fibers.

Thereafter, after the fibers have again been washed clean, the treatment of the fibers with the aqueous caustic soda solution will cause an extensive dissolution of all the denatured impurities, such as chlorinated lignin, hydrolysed and oxidized hemi-cellulose and minerals insoluble in acid, etc. which are all soluble in the aqueous caustic soda solution. The product is alpha cellulose which has an alpha cellulose content of more than 92 percent.

I have found that the alpha cellulose in bagasse has the characteristic of resistance to the attack of slight oxidizing agents if the alpha cellulose has not been treated by any alkali solution, but it loses such resistance entirely if it has been treated by any alkaline agent before being subject to an oxidizing agent. My process, therefore, postpones the treatment of the bagasse fibers with the aqueous caustic soda solution until after the fibers have been subjected to the oxidizing agents contained in the aqueous chlorine solution. It is for this and for the other reasons involved in the various steps that so large a percentage of the hemi-cellulose in the bagasse fibers can be removed by the process covered by this invention, with so little degradation on the alpha cellulose.

The alpha cellulose made from bagasse by the process described above is unbleached alpha cellulose and it may then be bleached by any suitable bleaching process. The bleaching process described in the tables given below is one of the good and effective ways of bleaching the alpha cellulose.

The alpha cellulose made from bagasse by the process covered by this invention is of high quality, both in purity and in polymerization. Such alpha cellulose is of great use in the manufacture of viscose rayon, nitrocellulose, cellulose acetate and ethyl cellulose, etc. The alpha cellulose made from bagasse under this process is of the same high quality as the alpha cellulose which may be made from wood under the process specially applicable to wood but the cost of production of alpha cellulose from bagasse under this process is considerably lower than the cost of making alpha cellulose from wood. Moreover, the process covered by the present invention is extremely economical in that it has no need for any mechanical treatment and it is not necessary even to have screens to screen the fibers. It is therefore, a practical and useful process and it is a new process invented by me.

While I have described in detail certain embodiments of my invention, it will be obvious to those skilled in the art that many improvements and modifications may be made therein, and I have set forth details only to enable those skilled in the art to understand how my invention may be used in certain of its preferred forms.

In the accompanying drawing, I have shown the process of making alpha-cellulose from bagasse according to my invention step by step. I now give below in separate and successive tables the result of each of the steps in my process on the bagasse fibers being treated.

*I.—Digestion*

1.—FIRST STAGE DIGESTION

| | |
|---|---|
| Chemical agents | Calcium bisulfite, Magnesium bisulfite and sulfurous acid (Ca:Mg=1:5 calculated as oxides by wt.). |
| Total SO₂ | 3.0. |
| Free SO₂/combined SO₂ | 10.5. |
| Dry wt. of bagasse | 100 kg. |
| Volume of bisulfite liquor | 800 liters. |
| Max. temperature | 147° C. |
| Time of max. temperature maintained | 3 hours. |

RESULT OF FIRST STAGE DIGESTION

1. Yield _____ 50 kg. of fibers
2. Alpha cellulose content _____ 78.5%.
3. Chlorine consumption for 80° G. E. brightness _____ 27.1%.
4. Viscosity (TAPPI method) _____ 46.2 centipoises.
5. Ash content _____ 1.36%.
6. Pentosan _____ 15%.

2.—SECOND STAGE DIGESTION

| | |
|---|---|
| Chemical agent | sodium sulfite. |
| Total $SO_2$ of the stock | 0.5%. |
| Free $SO_2$ | 0. |
| Combined $SO_2$ | 0.5%. |
| Weight of fibers | 50 kg. |
| Volume of stock | about 800 liters (not including the condensed water from the steam). |
| Maximum temp | 150° C. |
| Time of max. temp. maintained | 1 hour. |

RESULT OF SECOND STAGE DIGESTION
1. Yield — 45 kg. of fibers.
2. Alpha cellulose content — 81.5%.
3. Chlorine consumption for 80° G. E. brightness — 8.61%.
4. Viscosity (TAPPI method) — 38.3 centipoises
5. Ash content — 1.31%.
6. Pentosan — 13.2%.

II.—Refining

1.—HYDROLYSIS WITH MINERAL ACID

| | |
|---|---|
| Chemical agent | Hydrochloric acid. |
| Acid concentration of the stock | 0.07%. |
| Wt. of fibers | 45 kg. |
| Vol. of stock | About 800 liters (not including the condensed water of the steam). |
| Max. temperature | 100° C. |
| Time of max. temperature maintained | 2 hours. |

RESULT OF HYDROLYSIS
1. Yield — 42.7 kg. of fibers.
2. Alpha cellulose content — 82.2%.
3. Chlorine consumption — 6.7%.
4. Permanganate number — 12.
5. Ash content — 0.2%.

2.—CHLORINATION WITH CHLORINE WATER

| | |
|---|---|
| Chemical agent | Chlorine water. |
| Wt. of fibers | 42.7 kg. |
| Vol. of stock | about 650 liters. |
| Temperature | Room temperature. |
| Wt of chlorine added | 2562 grams. |
| Time for Chlorination | 20 min. |

RESULT OF CHLORINATION
1. Yield — 41 kg of fibers
2. Alpha cellulose content — 85%.
3. Ash content — 0.18%.

3.—DISSOLUTION WITH CAUSTIC SODA SOLUTION

| | |
|---|---|
| Chemical agent | 5% Sodium hydroxide solution. |
| wt. of fibers | 41.0 kg. |
| Vol. of Stock | 720 liters. |
| Max. temperature | 100° C. |
| Time of max. temperature maintained | 90 min. |

RESULT OF DISSOLUTION
1. Yield — 38 kg. of unbleached alpha cellulose.
2. Alpha cellulose content — 92.6%.
3. Beta cellulose content — 4.2%.
4. Gamma cellulose content — 3.0%.
5. Potassium hydroxide solubility — 7.2%.
6. Ether extractive matter — 0.15%.
7. Ash — 0.28%.
8. Viscosity (TAPPI method) — 28 centipoises.
9. Brightness — 72° G. E.
10. Pentosan — 5.63%.
11. Lignin content — Trace.
12. Chlorine consumption for 80° G. E. brightness — 0.15%.

III.—Bleaching

1.—FIRST STAGE BLEACHING

| | |
|---|---|
| Chemical Agent | 1:1 HCl and NaOCl. |
| wt. of unbleached alpha cellulose | 38 kg. |
| Vol. of stock | About 700 liters. |
| Temperature | Room temperature (21° C.). |
| Available chlorine added | 20 grams. |
| Time for bleaching | 20 min. |

RESULT OF FIRST STAGE BLEACHING
1. Yield — 37.6 kg. of alpha cellulose.
2. Brightness — 77° G. E.

2.—SECOND STAGE BLEACHING

| | |
|---|---|
| Chemical agent | 1:1 HCl and NaOCl. |
| Wt. of Alpha cellulose | 37.6 kg. |
| Vol. of stock | About 700 liters. |
| Available chlorine added | 12 grams. |
| Time for bleaching | 20 minutes. |

RESULT OF SECOND STAGE BLEACHING
1. Yield — 37.4 kg. of alpha cellulose.
2. Brightness — 79° G. E.

3.—THIRD STAGE BLEACHING

| | |
|---|---|
| Chemical agent | 1:1 HCl and NaOCl. |
| Wt. of alpha cellulose | 37.4 kg. |
| Available chlorine added | 8 grams. |
| Time for bleaching | 20 min. |

RESULT OF THIRD STAGE BLEACHING
1. Yield — 37.3 kg. bleached alpha cellulose.
2. Brightness — 82° G. E.
3. Alpha cellulose content — 92.4%.
4. Beta cellulose content — 4.4%.
5. Gamma cellulose content — 3.2%.
6. Potassium hydroxide solubility — 7.5%.
7. Ether extractive matter — 0.15%.
8. Ash — 0.22%.
9. Viscosity (TAPPI method) — 27 centipoises.
10. Pentosan — 5.6%.
11. Lignin content — Trace.

I claim:

1. A process for producing alpha cellulose of high purity and high degree of polymerization from bagasse and like fibrous lignose-cellulose materials comprising digesting bagasse in an aqueous solution containing from about 3 to about 4.5% of sulfur dioxide in which the ratio of free sulfur dioxide to combined sulfur dioxide is about 0.95–1.1 to 1, on a weight basis, said sulfur dioxide content derived from magnesium sulfite, calcium sulfite and sulfurous acid, the ratio of magnesium to calcium being about 3–5 to 1, based on the oxides, said digestion carried out at a temperature from about 145° to about 150° C. for about 3 to 4 hours, thereafter digesting the recovered bagasse fibers suspended in an amount of about 5 to 10% by weight of said fibers in an aqueous neutral sodium sulfite solution containing from about .03 to about 0.8% sulfur dioxide, by weight at a temperature below about 145° C. for at least about 30 minutes and for less than about 1 hour.

2. A process as in claim 1 wherein the cellulose fibers recovered from said second stage of digestion are further hydrolyzed in an amount of about 5 to 10% by weight of the fibers dispersed in a dilute aqueous mineral acid solution containing from about .03 to about .09% by weight of a hydrolyzing mineral acid selected from the group consisting of hydrochloric acid and sulfuric acid, at a temperature of about 90° C. to about 100° C. for at least 50 minutes.

3. A process as in claim 2 wherein the cellulose fibers recovered from the treatment with acid are bleached with a dilute chlorine solution, the amount of fibers being 5–10% of the solution, the amount of chlorine in said solution in accordance with the formula:

Grams of chlorine required for each kg. of fibers (calculated as bond-dry fibers) = permanganate number of the fibers × 3–5 the temperature of said chlorine solution being maintained from about 15° C. to about 30° C., and the fibers are neutralized after said chlorine treatment with a dilute alkali containing from about 0.5 to about 0.55% of alkali, by weight, whereafter the solution is heated to 90 to 115° C. or about 1 to 2 hours to obtain the purified alpha cellulose product.

4. A purified alpha cellulose product containing at least 92% of alpha cellulose, about 7 to 8% of beta and gamma cellulose, from about 0.1 to about 0.2% of ether extractive matter and about 0.2% ash, said composition having a TAPPI viscosity of about 25–40 centipoises, said product obtained by the sulfite digestion of bagasse at temperatures from about 145° C. to about 150° C. for about 3 hours, digestion with neutral sulfite containing .03–.08% $SO_2$, hydrochloric acid digestion at about 95° C.–100° C. for about 1 hour, the hydrochloric acid concentration being from about .03 to about .09 per cent by weight of the acid treating solution and by a bleaching chlorine treatment at about 20 to 30° for about 20 to 30 minutes.

References Cited in the file of this patent

UNITED STATES PATENTS

| | | |
|---|---|---|
| 1,761,543 | Spencer | June 3, 1930 |
| 1,825,349 | Hagiwara | Sept. 29, 1931 |
| 1,830,421 | Bradley et al. | Nov. 3, 1931 |
| 1,846,511 | Darling | Feb. 23, 1932 |
| 1,848,661 | Richter | Mar. 8, 1932 |

OTHER REFERENCES

Richter (2): Industrial and Eng. Chem. 23, 138 and 139, 1931, 92–3W*a*.

Tutiya et al.: Chemical Abstracts, vol. 36, pp. 4332, 4333, 1942.

Utilization of Sugar Cane Bagasse for Paper, Board, Plastics and Chemicals (Tech. Report Series No. 8) by West, 2nd ed., pp. 44, 45, 53 and 75, pub. by Sugar Research Foundation, Inc., New York, February 1952.